United States Patent [19]

Arai

[11] Patent Number: 4,760,595
[45] Date of Patent: Jul. 26, 1988

[54] SUBSCRIBER LINE INTERFACE CIRCUIT HAVING MEANS FOR COMBINING DC AND AC FEEDBACK SIGNALS

[75] Inventor: Masanobu Arai, Tokyo, Japan

[73] Assignee: NEC Corporation, Japan

[21] Appl. No.: 908,187

[22] Filed: Sep. 17, 1986

[30] Foreign Application Priority Data

Sep. 20, 1985 [JP] Japan .................. 60-209476
Sep. 20, 1985 [JP] Japan .................. 60-209477
Sep. 20, 1985 [JP] Japan .................. 60-209478

[51] Int. Cl.$^4$ .................. H04B 3/03; H04M 19/00
[52] U.S. Cl. .................. 379/385; 379/398; 379/405; 379/413
[58] Field of Search .................. 379/379, 345, 398, 399, 379/402, 405, 385, 377, 380, 382

[56] References Cited

U.S. PATENT DOCUMENTS

| | | | |
|---|---|---|---|
| 4,532,381 | 7/1985 | Rosenbaum et al. | 379/345 |
| 4,600,811 | 7/1986 | Hayashi et al. | 379/405 X |
| 4,607,141 | 8/1986 | Schorr | 379/398 |
| 4,661,978 | 4/1987 | Hirata | 379/394 |
| 4,677,667 | 6/1987 | Burns | 379/398 |

Primary Examiner—Jin F. Ng
Assistant Examiner—Randall S. Vaas
Attorney, Agent, or Firm—Laff, Whitesel, Conte & Saret

[57] ABSTRACT

A subscriber line interface circuit comprises a balanced amplifier having positive and negative inputs for amplifying a voltage thereacross to generate a pair of mutually complementary voltages across true and complementary outputs. Four resistors of a first value are respectively connected between a subscriber tip line and the negative input, between a subscriber ring line and the positive input, between the negative input and true output and between the positive input and complementary output. Two resistors of a second value smaller than the impedance of the subscriber loop are respectively connected between the tip line and the complementary output and between the ring line and the true output. A DC feedback circuit is connected to the complementary output to generate a DC feedback signal according to a desired variable DC power feeding characteristic. An AC feedback circuit generates an AC feedback signal proportional to a differential voltage across the tip and ring lines and inversely proportional to a desired AC impedance. The DC and AC feedback signals are combined in a circuit which supplies to the negative input a current corresponding to the combined signals.

3 Claims, 1 Drawing Sheet

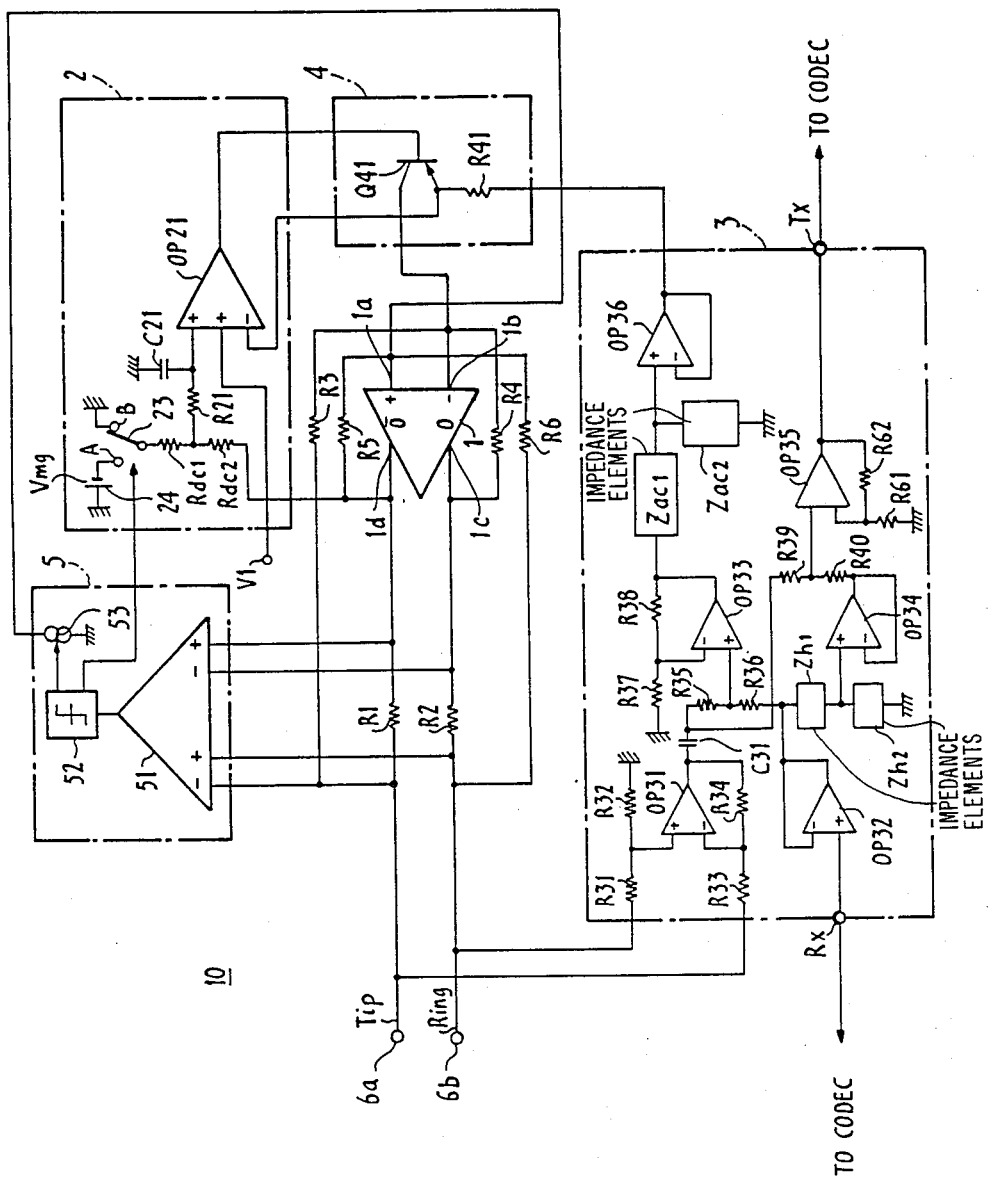

SUBSCRIBER LINE INTERFACE CIRCUIT HAVING MEANS FOR COMBINING DC AND AC FEEDBACK SIGNALS

BACKGROUND OF THE INVENTION

The present invention relates to a subscriber line interface circuit for telephone exchanges.

A subscriber line interface circuit as shown and described in articles "A Versatile Subscriber Line Interface Circuit" by Nishimura et al, ESSCIRC-83 (European Solid-State Circuit Conference 1983) and "General-Purpose Subscriber Circuit Using High-Voltage LSI for NEAX-61 Fully Digital Local Switch" by Arai et al, ICC-84 (International Conference on Communication 1984), employs a high-impedance feedback circuit and a plural feedback circuits which synthesizes desired impedances according to different frequency bands. This subscriber line circuit has a wide range of adaptability to various operating conditions which may be encountered in telephone exchanges.

Another prior art circuit is disclosed in European Patent Application No. 0,147,230. This prior art provides high precision impedance synthesis by a single-amplifier high-impedance feedback configuration.

However, in these prior art interface circuits DC and AC feedback circuits are coupled to the positive and negative input terminals of a balanced amplifier. As a result of this configuration, these prior art circuits are still unsatisfactory from the circuit complexity and power consumption points of view if they are implemented by LSI (Large Scale Integration) technology.

In addition, while the prior art described in the aforesaid articles is capable of setting a feed resistance at a desired value of 200 ohms×2 or 400 ohms×2 with the use of two resistors connected in the tip and ring lines to the outputs of a balanced amplifier and capable of setting a constant current at a desired value of 35 mA or 80 mA with a current limiter in a DC feedback circuit, the variation of the feed resistance accompanies an undesirable variation of the constant current and a further undesirable variation of a threshold by which the subscriber loop is monitored for detection of on- and off-hook conditions.

Furthermore, it is important for telephone services to ensure that subscriber line interface circuits have good longitudinal balance even when the tip-ring voltage of the interface circuit goes beyond the active bias region of the LSI circuitry when the subscriber line goes on-hook. The aforesaid prior art circuits have a constant DC feedback control characteristic by which a predetermined amount of DC current is fed back to an output circuit to cause the tip-ring voltage to be controlled in the active bias region which is typically a few volts within the range between ground and battery voltage during on-hook conditions. However, in a subscriber line interface circuit in which the feed resistance is variable, the constant current DC feedback would result in a variation of the bias voltage due to interaction between the variable feed resistance and the constant DC feedback current.

SUMMARY OF THE INVENTION

It is therefore an object of the present invention to provide a subscriber line interface circuit having reduced circuit elements to enable it to be implemented in a low-cost, low power consumption LSI package.

This object is attained by the provision of a circuit which combines the outputs of a DC feedback circuit and an AC feedback circuit and supplies a current proportional to the combined signals to a balanced amplifier. With this arrangement, the input circuit connected to the balanced circuit is significantly simplified and the undesired capacitances associated with the input circuit which might lead to an instability of the amplifier are reduced.

More specifically, the subscriber line interface circuit of the invention comprises a balanced amplifier having a positive input terminal and a negative input terminal for amplifying a voltage across the positive and negative input terminals and generating a pair of mutually complementary voltages across a true output terminal and a complementary output terminal, the complementary voltages varying oppositely to each other and symmetrically with respect to a reference voltage. Four resistors of a first, substantially equal resistance value are respectively connected between a first terminal of a subscriber loop and the amplifier's negative input terminal, between a second terminal of the loop and the amplifier's positive input terminal, between the amplifier's negative input and true output terminals and between the amplifier's positive input and complementary output terminals. Two resistors of a second, equal resistance value are respectively connected between the first terminal of the loop and the amplifier's complementary output terminal and between the second terminal of the loop and the amplifier's true output terminal, the second resistance value being smaller than a reference impedance of the subscriber loop. A DC feedback circuit for providing a desired variable feed resistance is connected to one of the true and complementary output terminals of the amplifier for generating a DC feedback signal. An AC feedback circuit is connected to the first and second terminals of the loop for generating an AC feedback signal which is proportional to a differential voltage across the first and second terminals and inversely proportional to a desired AC impedance. The DC feedback signal and the AC feedback signal are combined in a combining circuit which derives an output from the combined signals which unbalanced with respect to the reference voltage and supplies it to one of the positive and negative input terminals of the amplifier.

To provide a subscriber line interface circuit in which the feed resistance value and constant current value are independently variable, the two resistors connected to the amplifier's outputs are not used as the variation factor, but the DC feedback signal is rendered proportional to the voltage applied to the DC feedback circuit from the balanced amplifier and inversely proportional to a resistance value which is smaller than a desired feed resistance value by an amount equal to the second resistance value when the subscriber loop has a relatively high resistance and the DC feedback signal is proportional to a desired constant current limit value when the subscriber loop has a relatively low resistance.

To ensure that the subscriber line interface circuit operate with a substantially constant bias voltage regardless of the variation of DC feedback coefficient during on-hook, an on-hook detector is provided for detecting an on-hook condition in the subscriber loop and the voltage dividing network of the DC feedback circuit divides a voltage between the input voltage supplied thereto from the balanced amplifier and a predetermined low voltage to supply a first DC feedback signal to the combining circuit in proportion to the divided voltage when the on-hook condition is not detected and divides a voltage between the input voltage supplied thereto from the balanced amplifier and a predetermined high voltage to supply a second DC feedback signal to the combining circuit in proportion to the last-mentioned divided voltage when the on-hook condition is detected. Furthermore, in response to the detection of the on-hook condition, a current is supplied to the input terminal of the balanced amplifier which is opposite to the input terminal to which the output of the combining circuit is applied for cancelling an effect produced at the output terminals of the balanced amplifier in response to the second DC feedback signal.

BRIEF DESCRIPTION OF THE DRAWING

The present invention will be described in further detail with reference to the accompanying drawing in which a circuit diagram of the subscriber line interface circuit according to an embodiment of the present invention is illustrated.

DETAILED DESCRIPTION

Referring now to the sole drawing, there is shown a subscriber line interface circuit according to an embodiment of the present invention. The subscriber line interface circuit, generally shown at 10, comprises a balanced amplifier 1, a DC feedback circuit 2, an AC feedback circuit 3, a combining circuit 4 and a loop-status feedback circuit 5 which operates during subscriber on-hook conditions to prevent the voltage at the output of balanced amplifier 1 from exceeding beyond the operating range of the circuit 21. The balanced amplifier 1 has a positive input terminal 1a and a negative input terminal 1b which are respectively coupled by resistors R5 and R4 to true and complementary output terminals 1c and 1d of the balanced amplifier and further connected by resistors R6 and R3 to the ring and tip terminals 6b and 6a to which a subscriber loop is connected. The output terminals 1c and 1d of amplifier 1 are connected respectively by resistors R2 and R1 to tip and ring terminals 6a, 6b. Balanced amplifier 1 provides amplification of a voltage developed across the input terminals 1a and 1b and generates a pair of mutually complementary output voltages at the output terminals 1c and 1d so that they vary oppositely to each other and symmetrically with respect to a reference potential Vr. Each of the resistors R3, R4, R5 and R6 has an equal resistance value Rh which is typically several tens of kiloohms. Resistors R1 and R2 are of equal resistance value Rf which is much smaller than the reference impedance (600 or 900 ohms) of the subscriber loop, typically, several tens of ohms.

Loop-status feedback circuit 5 comprises an on-hook detector 51 coupled across the resistors R1 and R2 to detect currents passing through the tip and ring lines. A comparator 52 is connected to the output of on-hook detector 51 to compare the detected current with a threshold and generates a switching signal when the current is lower than the threshold as an indication of a subscriber on-hook and at the same time causes a constant current source 53 to supply a DC current to the positive input 1a of balanced amplifier 1. If the balanced amplifier 1 is in balance between the tip and ring lines, the current supplied from the constant current source 53 is equal in magnitude to the current supplied from the DC feedback circuit 2 and flows in such a direction that it cancels the effect produced at the true and complementary output terminals 1c and 1d by the DC feedback current.

DC feedback circuit 2 receives an input signal from one of the output terminals 1c and 1d of balanced amplifier 1. In the illustrated embodiment, the complementary output terminal 1d is coupled to a follower amplifier OP21 having a maximum selector through a voltage dividing network formed by resistors Rdc1 and Rdc2 (whose ratio determines the feed resistance) and through a resistor R21 coupled to the dividing network. Resistors Rdc1 and Rdc2 have the following ratio:

$$Rdc1 : Rdc2 = \frac{2}{K} : \frac{K-3}{K}$$

where K is a constant. During off-hook conditions, a switch 23 is in the B position to connect the voltage dividing network to ground to divide a voltage Voc between the complementary output terminal 1d and ground to generate a voltage $2Voc/(K-1)$ at the junction between resistors Rdc1 and Rdc2. During on-hook conditions, the switch 23 is moved to the position A in response to the switching signal from the loop-status feedback circuit 5 to connect the voltage dividing network to a voltage source 24 having a potential Vmg, so that the potential applied to the dividing resistors Rdc1 and Rdc2 are reduced by potential Vmg to cause a voltage $\{2Voc + (K-3)Vmg\}/(K-1)$ to be developed therebetween. A capacitor C21 is connected between the resistor R21 and ground to impress the response characteristic of a low-pass filter on the signal applied to the follower amplifier OP21. A voltage V1 is applied to the amplifier OP21 for setting a constant current. Follower amplifier OP21 has a function of selecting the highest of the signals applied to its positive input terminals.

Combining circuit 4 is formed by a transistor Q41 and a resistor R41 which couples the output of the AC feedback circuit 3 to the emitter of transistor Q41. The collector of transistor Q41 is connected to the negative input 1b of amplifier 1. The output of follower amplifier OP21 is connected to the base of transistor Q41 and its emitter is connected to the negative input of follower amplifier OP21, so that amplifier OP21 operates to equalize the potential at the emitter of transistor Q41 to either of the voltage V1 and the output of the dividing network which is the highest.

AC feedback circuit 3 comprises an operational amplifier OP31 which cooperate with resistors R31 through R34 as a differential amplifier to generate a differential voltage across the tip and ring terminals 6a and 6b. The output of operational amplifier OP31 is coupled by way of a DC decoupling capacitor C31 to a well known interface circuit formed by operational amplifiers OP32, OP34, OP35, impedance elements Zh1, Zh2 and resistors R39, R40, R61 and R62. The interface circuit is coupled through terminals Rx and Tx to a known codec (coder-decoder) through which the subscriber loop is coupled to the switching network of the telephone exchange. Since this portion of the circuit forms no part of the present invention, the description thereof has been omitted. Further included are an operational amplifier OP33 and resistors R35 through R38 connected to the amplifier OP33 to sum the differential voltage between the tip and ring terminals and the voltage at the terminal Rx. The output of operational amplifier OP33 is coupled to an impedance network formed by impedance elements Zac1 and Zac2 whose junction is connected to an operational amplifier OP36. If Zac1=Zac(1−m) and Zac2=m.Zac (where Zac represents a desired AC impedance and m is a constant), the operational amplifier OP36 provides an output voltage −2Rf(Vtip−Vring)/Zac.

If the resistor R41 of the combining circuit 4 is equal to the resistance value Rh, the current withdrawn from the negative input 1b of the balanced amplifier equals the difference between the output of operational amplifier OP36 and the voltage at the emitter of transistor Q41 divided by the resistance Rh.

The operation of the subscriber line interface circuit 10 will be described in quantitative terms as follows.

Balanced amplifier 1 has such a large amplification gain that the resistors R4 and R5 operate as a negative feedback resistors, so that voltages V+ and V− at the positive and negative input terminals 1a and 1b are:

$$V+ = V- \quad (1)$$

Since the input terminals 1a and 1b withdraw no currents, the following relations hold:

$$Vot = 2V+ - Vtip \quad (2)$$

$$Voc = 2V+ - Vring \quad (3)$$

where, Vot and Voc are voltages at the true and complementary output terminals 1c and 1d, respectively. If each of the voltages Vot and Voc has an average value which is equal to the reference voltage Vr, then the following relations can be established to provide high impedance feedback control:

$$\begin{pmatrix} Voc \\ Vot \end{pmatrix} = \begin{pmatrix} Vr \\ Vr \end{pmatrix} + \begin{pmatrix} \tfrac{1}{2} & -\tfrac{1}{2} \\ -\tfrac{1}{2} & \tfrac{1}{2} \end{pmatrix} \begin{pmatrix} Vtip \\ Vring \end{pmatrix} \quad (4)$$

AC feedback circuit 3 generates the following feedback signal:

$$K_1 2Rf/Zac\ (Vtip - Vring) \quad (5)$$

where, $K_1$ is a proportionality constant. The AC feedback circuit 3 is usually provided with a high-pass filter so that AC feedback circuit 3 has a minimum effect on DC feedback circuit 2.

During off-hook conditions, the DC feedback circuit 2 provides the following feedback signal if the desired feed resistance is Zdc×2:

$$\max\left[ -K'' \cdot Imax, \frac{K''\ Hlp}{Zdc - Rf} Voc \right] \quad (6)$$

where,
 Imax=the desired constant current value;
 −K″.Imax=V1; and
 Hlp=a low-pass filter characteristic.

The factor −K″.Imax of Equation 6 is dominant if Imax of Equation 6 is dominant if the subscriber loop resistance is relatively small and operates in a current limiting mode and the factor K″.Hlp.Voc/(Rdc−Rf) is dominant for subscriber loops with a relatively high resistance and operates in a constant resistance feed mode. If K1=1 and K″=2Rf, the combining circuit 4 withdraws a current "If" from the positive input terminal 1a of the balanced amplifier 1:

$$If = -\frac{2Rf}{Zac \cdot Rh}(Vtip - Vring) \quad (7)$$
$$- \max\left[ -\frac{2Rf\ Imax}{Rh}, \frac{2Hlp}{K-1} \cdot \frac{Voc}{Rh} \right]$$

where K=Zdc/Rf.

Because of the balancing nature of the amplifier 1, the voltages at the true and complementary outputs of amplifier 1 vary as follows:

$$\begin{pmatrix} \Delta Voc \\ \Delta Vot \end{pmatrix} = \begin{pmatrix} (Rf/2)\ If \\ -(Rh/2)If \end{pmatrix} \quad (8)$$

As a result, the overall operating characteristic of the subscriber line interface circuit 10 is given by:

$$\begin{pmatrix} Voc \\ Vot \end{pmatrix} = \begin{pmatrix} Vr \\ Vr \end{pmatrix} + \quad (9)$$

$$\begin{pmatrix} (\tfrac{1}{2}) - (Rf/Zac) & -(\tfrac{1}{2}) + (Rf/Zac) \\ -(\tfrac{1}{2}) + (Rf/Zac) & (\tfrac{1}{2}) - (Rf/Zac) \end{pmatrix} \begin{pmatrix} Vtip \\ Vring \end{pmatrix} +$$

$$\begin{pmatrix} -\max[-Rf \cdot Imax \cdot Hlp \cdot Voc/(K-1)] \\ \max[Rf \cdot Imax \cdot Hlp \cdot Voc/(K-1)] \end{pmatrix}$$

Assume that Vtip=−Vring=V2w/2, where V2w is an AC differential signal, the following relations are derived from Equation 9:

$$Voc = \left( \frac{1}{2} - \frac{Rf}{Zac} \right) V2w \quad (10)$$

$$Vot = -\left( \frac{1}{2} - \frac{Rf}{Zac} \right) V2w \quad (11)$$

As a result, the resistors R1 and R2 have the following impedance when viewed from the subscriber loop to the tip and ring terminals:

$$Z = \frac{V2w/2}{\frac{(V2w/2) - Voc}{Rf}} = \frac{-V2w/2}{\frac{-(V2w/2) - Voc}{Rf}} = Zac/2 \quad (12)$$

Being equal to the sum of impedances synthesized by resistors R1 and R2 of the value Rf, the differential impedance of the subscriber line interface circuit is precisely calibrated to the desired impedance value Zac.

From the DC feedback point of view, Equation 9 can be rewritten as:

$$\begin{pmatrix} Voc \\ Vot \end{pmatrix} = \begin{pmatrix} Vbb/2 \\ Vbb/2 \end{pmatrix} + \begin{pmatrix} \tfrac{1}{2} & -\tfrac{1}{2} \\ -\tfrac{1}{2} & \tfrac{1}{2} \end{pmatrix} \begin{pmatrix} Vtip \\ Vring \end{pmatrix} + \begin{pmatrix} -Rf \cdot Imax \\ Rf \cdot Imax \end{pmatrix} \quad (13)$$

if Vr=Vbb/2 and −Rf.Imax>Hlp.Vot/(K−1), where Vbb represents the operating voltage of the telephone exchange, normally −48 volts.

Since the voltages Vtip and Vring are symmetrical to the operating voltage Vbb and since Vtip+Vring=Vbb, Equation 13 can be rewritten as:

$$\begin{pmatrix} Voc \\ Vot \end{pmatrix} = \begin{pmatrix} Vtip - Rf \cdot Imax \\ Vring + Rf \cdot Imax \end{pmatrix} \quad (14)$$

Resistors R1 and R2 thus pass a DC current in an amount equal to Imax. If $-Rf.Imax < Vot.Hlp/(K-1)$, Equation 9 can be rewritten as:

$$\begin{pmatrix} Voc \\ Vot \end{pmatrix} = \begin{pmatrix} Vbb/2 \\ Vbb/2 \end{pmatrix} + \quad (15)$$

$$\begin{pmatrix} \frac{1}{2} & -\frac{1}{2} \\ -\frac{1}{2} & \frac{1}{2} \end{pmatrix} \begin{pmatrix} Vtip \\ Vring \end{pmatrix} + \begin{pmatrix} -Voc/(K-1) \\ Voc/(K-1) \end{pmatrix}$$

If voltages Voc, Vot, Vtip and Vring are symmetrical with respect to the reference Vbb/2, the following Equation holds:

$$Vtip = Voc.K/(K-1) \quad (16)$$

The desired feed resistance thus equals K.Rf ×2 (ohms). It is seen that by varying the constant K, the feed resistance of a desired value can be realized.

During on-hook conditions in which the loop-status feedback circuit 5 is in an active mode, the DC feedback circuit 2 provides the following feedback signal:

$$\max\left[ \frac{-2Rf \cdot Imax}{Rh}, \frac{Voc \cdot Rdc1 + Vmg \cdot Rdc2}{(Rdc1 + Rdc2)Rh} \right] \quad (17)$$

The right term in the brackets of Equation 17 represents the voltage supplied to the amplifier OP21 when the voltage source 24 is connected into circuit by switch 23 and is a dominant factor during the on-hook condition.

The constant current source 53 of loop-status feedback circuit 5 provides a current Ioh having the following relationship:

$$Ioh = Vmg/Rh \quad (18)$$

The voltages Voc and Vot at the complementary and true output terminals 1d and 1c vary as follows:

$$\begin{pmatrix} \Delta Voc \\ \Delta Vot \end{pmatrix} = \begin{pmatrix} -(Rh/2)Ioh \\ (Rh/2)Ioh \end{pmatrix} \quad (19)$$

If the voltages Voc, Vot, Vtip and Vring are symmetrical with respect to Vbb/2, the high-impedance feedback, DC feedback and loop-status feedback operations combine to produce the following relation:

$$Vtip - Vmg = \frac{2Rdc2 + 3Rdc1}{2Rdc2 + 2Rdc1} (Voc - Vmg) \quad (20)$$

Therefore, relations Vtip=Voc=Vmg and Vring=Vot= Vbb+Vmg are established during on-hook conditions regardless of the feed resistance which is determined by Rdc1 and Rdc2, and the voltages at the true and complementary output terminals 1c and 1d of the amplifier 1 are maintained constant. Under this condition, the current fed back to amplifier 1 from the DC feedback circuit 2 is equal to −Vmg/Rh and hence to Ioh. However, the effects produced by this current at the output terminals of amplifier 1 are cancelled with each other. The tendency of the voltage at the complementary output terminal 1c of amplifier 1 to deviate from Vmg is nullified by the negative feedback operation of the DC feedback circuit 2.

Since the operational amplifiers OP32 through OP36 of the AC feedback circuit 3 exclusively pass AC signal signals, they can be operated at a relatively low voltage with a small amount of power consumption. On the other hand, the balanced amplifier 1 and operational amplifiers OP21, OP31 and OP51 must respond to the varying potential across the tip and ring terminals 6a and 6b while operating on the battery voltage of −48 volts. Therefore, these amplifiers tend to account for a greater part of the total power consumption of the subscriber line interface circuit. Advantageously, the number of such battery operating amplifiers is reduced to a minimum in comparision with the prior art interface circuits.

The foregoing description shows only one preferred embodiment of the present invention. Various modifications are apparent to those skilled in the art without departing from the scope of the present invention which is only limited by the appended claims.

What is claimed is:

1. A subscriber line interface circuit comprising:
   a balanced amplifier having a positive input terminal and a negative input terminal for amplifying a voltage across said positive and negative input terminals and generating a pair of mutually complementary voltages across a true output terminal and a complementary output terminal, the complementary voltages varying oppositely to each other and symmetrically with respect to a reference voltage;
   a first plurality of four resistors of substantially equal resistance value respectively connected between a first terminal of a subscriber loop and said negative input terminal, between a second terminal of the loop and said positive input terminal, between said negative input and true output terminals and between said positive input and complementary output terminals;
   a second plurality of two resistors of equal resistance value respectively connected between said first terminal of the loop and said complementary output terminal and between said second terminal of the loop and said true output terminal, the resistance value of said second plurality of two resistors being smaller than a reference impedance of said subscriber loop;
   a DC feedback circuit connected to one of said true and complementary output terminals of the amplifier for generating a DC feedback signal and providing a desired variable DC power feeding characteristic;
   an AC feedback circuit connected to said first and second terminals of the loop for generating an AC feedback signal which is proportional to a differential voltage across said first and second terminals and inversely proportional to a desired AC impedance; and
   a combining circuit for combining said DC feedback signal and said AC feedback signal, deriving an output signal which is unbalanced with respect to said reference voltage from the combined signals and supplying the output signal to one of said positive and negative input terminals of the amplifier.

2. A subscriber line interface circuit as claimed in claim 1, wherein said DC feedback circuit comprises means for causing said DC feedback signal to be proportional to the voltage applied thereto from said balanced amplifier and inversely proportional to a resistance value which is smaller than a desired feed resistance value by an amount equal to the resistance value of each of said second plurality of two resistors when the subscriber loop has a relatively large resistance value and causing said DC feedback signal to be proportional to a desired constant current limit value when the subscriber loop has a relatively small resistance value.

3. A subscriber line interface circuit as claimed in claim 1, further comprising an on-hook detector for detecting an on-hook condition in said subscriber loop, wherein said DC feedback circuit comprises means for deriving a first DC feedback signal which is proportional to a value between an input voltage supplied thereto from said balanced amplifier and a predetermined low voltage and supplying said first DC feedback signal to said combining circuit when said on-hook condition is not detected and deriving a second DC feedback signal which is proportional to a value between said input voltage and a predetermined high voltage and supplying said second DC feedback signal to said combining circuit when said on-hook condition is detected, and means responsive to the detection of said on-hook condition for supplying a cancelling signal to the input terminal of said balanced amplifier which is opposite to the terminal to which the output of said combining circuit is applied for cancelling an effect produced at the output terminals of said balanced amplifier as a result of said second DC feedback signal.

* * * * *